(12) United States Patent
Zhao et al.

(10) Patent No.: US 12,506,871 B2
(45) Date of Patent: Dec. 23, 2025

(54) POINT CLOUD ENCODING METHOD, POINT CLOUD DECODING METHOD, POINT CLOUD ENCODING DEVICE, AND POINT CLOUD DECODING DEVICE

(71) Applicant: PENG CHENG LABORATORY, Shenzhen (CN)

(72) Inventors: Wenbo Zhao, Shenzhen (CN); Jing Wang, Shenzhen (CN); Ge Li, Shenzhen (CN); Wen Gao, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 169 days.

(21) Appl. No.: 18/681,633

(22) PCT Filed: Aug. 23, 2022

(86) PCT No.: PCT/CN2022/114346
§ 371 (c)(1),
(2) Date: Feb. 6, 2024

(87) PCT Pub. No.: WO2023/025167
PCT Pub. Date: Mar. 2, 2023

(65) Prior Publication Data
US 2025/0142073 A1    May 1, 2025

(30) Foreign Application Priority Data
Aug. 24, 2021   (CN) .......................... 202110975997.2

(51) Int. Cl.
*H04N 19/13*   (2014.01)
*G06T 9/00*   (2006.01)
(Continued)

(52) U.S. Cl.
CPC ............... *H04N 19/13* (2014.11); *G06T 9/00* (2013.01); *H04N 19/136* (2014.11); *H04N 19/184* (2014.11)

(58) Field of Classification Search
CPC ...... H04N 19/42; H04N 19/44; H04N 19/597; H04N 19/96; H04N 21/00
See application file for complete search history.

(56) References Cited

U.S. PATENT DOCUMENTS

2019/0311499 A1* 10/2019 Mammou ................. G06T 7/50
2019/0313110 A1  10/2019 Mammou et al.
(Continued)

FOREIGN PATENT DOCUMENTS

| CN | 110572655 A | 12/2019 |
| CN | 112219227 A | 1/2021 |
| CN | 112740702 A | 4/2021 |

OTHER PUBLICATIONS

Shuai et al., "A Fast and Lossy Compression Algorithm for Point-Cloud Models Based on Data Type Conversion", Journal of Graphics, Apr. 2016, pp. 200-205, vol. 37, No. 2.

*Primary Examiner* — Fabio S Lima
(74) *Attorney, Agent, or Firm* — The Webb Law Firm

(57) ABSTRACT

A point cloud encoding method, decoding method, encoding device, and decoding device are disclosed. The point cloud encoding method includes calculating a distance from a first point to a parent point of the first point as a first distance; determining a point in un-encoded points closest to the first point as a second point, and calculating residual values on N coordinate components from the second point to the first point; encoding absolute values of the residual values on the N coordinate components from the second point to the first point; encoding signs of the residual values of the second point based on the residual values of the second point and the first distance. The present disclosure utilizes the geom-
(Continued)

etry position relationship between points in a point cloud to encode the absolute values of residual values and the feasible signs of residual values, thereby improving the encoding efficiency of residual values. At the same time, by optimizing the encoding efficiency of residual values, the performance of point cloud prediction tree encoding is improved.

14 Claims, 2 Drawing Sheets

(51) Int. Cl.
*H04N 19/136* (2014.01)
*H04N 19/184* (2014.01)

(56) References Cited

U.S. PATENT DOCUMENTS

| | | | |
|---|---|---|---|
| 2021/0104075 A1* | 4/2021 | Mammou | G06T 9/40 |
| 2021/0250594 A1* | 8/2021 | Gao | G06T 9/40 |
| 2022/0191545 A1* | 6/2022 | Sugio | H04N 19/597 |
| 2022/0207472 A1* | 6/2022 | Hashisho | G06V 20/13 |
| 2022/0247427 A1* | 8/2022 | Zhang | H03M 7/3079 |
| 2022/0343548 A1* | 10/2022 | Park | H04N 21/4402 |
| 2023/0209099 A1* | 6/2023 | Hur | H04N 19/174 |
| | | | 375/240.12 |
| 2023/0260163 A1* | 8/2023 | Lee | G06T 9/40 |
| | | | 345/419 |

* cited by examiner

POINT CLOUD ENCODING METHOD, POINT CLOUD DECODING METHOD, POINT CLOUD ENCODING DEVICE, AND POINT CLOUD DECODING DEVICE

CROSS-REFERENCE TO RELATED APPLICATIONS

This application is the United States national phase of International Application No. PCT/CN2022/114346 filed Aug. 23, 2022, and claims priority to Chinese Patent Application No. 202110975997.2 filed Aug. 24, 2021, the disclosures of which are hereby incorporated by reference in their entireties.

BACKGROUND

1. Technical Field

The present disclosure relates to the technical field of point cloud encoding and decoding, and in particular relates to a point cloud encoding method, a point cloud decoding method, a point cloud encoding device, and a point cloud decoding device.

2. Technical Considerations

A point cloud is a set of randomly distributed discrete points in space that represent the spatial structure and surface attribute of a three-dimensional object or scene. Each point of the point cloud has at least three-dimensional geometry position information, and may also have color, material, or other information depending on the application scenario. Usually, each point of a point cloud has the same number of attributes.

The point cloud contains a large number of unordered points. When encoding geometry positions of the points of the point cloud, there is a coding scheme called prediction tree in the current coding standard, which connects the points of the point cloud into a tree by adding directed edges between them, so that the points have a sequential relationship. The geometry position of the current point is predicted based on the geometry position of the preceding points. The residual value between the predicted value and the true value is calculated and encoded to achieve the encoding of point cloud geometric information.

In existing technology, geometric prediction encoding takes into account the three preceding nodes of the current node (the preceding node represents the node before the current node) and selects the optimal mode among four different prediction modes. However, when encoding the residual value, this method first arithmetically encodes the sign bit of the residual value, and then arithmetically encodes the absolute value of the residual value. This process has not been optimized, resulting in a higher number of bits required for encoding the residual value.

In addition, for the geometric encoding scheme with a single prediction mode, this method selects the un-encoded point closest to the current node each time as the point to be encoded and calculates the residual value. Therefore, there is no need to encode the prediction mode, only the residual value needs to be encoded. However, when encoding the residual value in this method, the sign bit of the residual value is first arithmetically encoded, and then the absolute value of the residual value is arithmetically encoded, without optimizing this process, this results in a higher number of bits required for encoding the residual value.

Therefore, the existing technology still needs improvement and development.

SUMMARY

The main purpose of the present disclosure is to provide a point cloud encoding method, a point cloud decoding method, a point cloud encoding device, and a point cloud decoding device. The aim is to solve the problem of encoding residual values in existing technology by first arithmetically encoding the sign bit of the residual value, and then arithmetically encoding the absolute value of the residual value. This process is not optimized, resulting in a large number of bits required for encoding residual values and low efficiency of residual value encoding.

To achieve the above purpose, the present disclosure provides a point cloud encoding method, which comprises the following steps:
  calculating a distance from a first point to a parent point of the first point as a first distance;
  determining a point in un-encoded points closest to the first point as a second point, and calculating residual values on N coordinate components from the second point to the first point;
  encoding absolute values of the residual values on the N coordinate components from the second point to the first point;
  encoding signs of the residual values of the second point based on the residual values of the second point and the first distance.

Optionally, in the point cloud encoding method, the encoding signs of the residual values of the second point based on the residual values of the second point and the first distance, comprises:
  traversing the signs of the residual values to obtain M residual values;
  obtaining M points based on the M residual values and coordinate values of the first point;
  calculating distances from the parent point of the first point to the M points as second distances;
  determining feasibilities of the signs of the residual values corresponding to the M points based on the second distances and the first distance;
  encoding the signs of the residual values of the second point based on the feasibilities of the signs of the residual values corresponding to the M points.

Optionally, in the point cloud encoding method, the first distance or the second distance is determined by:
  calculating a weighted sum of T-powers of absolute values of differences between N coordinate components of two points;
  or, calculating a maximum value of weighted absolute values of differences between N coordinate components of two points.

Optionally, in the point cloud encoding method, the encoding the signs of the residual values of the second point based on the feasibilities of the signs of the residual values corresponding to the M points, comprises:
  mapping signs corresponding to all feasible P points to new numbers based on the feasibilities of the signs of the residual values corresponding to the M points;
  encoding the new number corresponding to the signs of the residual values of the second point.

Optionally, in the point cloud encoding method, the encoding the new number corresponding to the signs of the residual values of the second point, comprises:

encoding binary bits of the new number corresponding to the signs of the residual values of the second point in a descending order;

when encoding a i-th bit, setting the i-th bit to 1 and the remaining un-encoded bits to 0, and denoting a corresponding decimal value as D;

if D>P, then the i-th bit cannot be 1, and there is no need to encode; otherwise, encoding the i-th bit by context based arithmetic coding.

Optionally, in the point cloud encoding method, the encoding the signs of the residual values of the second point based on the feasibilities of the signs of the residual values corresponding to the M points, comprises:

calculating a maximum number of infeasible signs after a bit of the signs of the residual values of the second point is encoded;

sorting bits of the signs according to the maximum number of infeasible signs in a descending order, and encoding the sorted bits of the signs in the same descending order.

In addition, to achieve the above purpose, the present disclosure also provides a point cloud encoding device, wherein the device comprises a processor, a memory and a communication bus; the memory stores one or more computer readable programs which are executable by the processor;

the communication bus realizes a connection communication between the processor and the memory;

the processor, when executing the one or more computer readable programs, implements the steps in the point cloud encoding method as described above.

The present disclosure also provides a point cloud decoding method, comprising:

decoding a bit stream of a point cloud to obtain absolute values of residual values on N coordinate components from a second point to a first point;

calculating a distance from the first point to a parent point of the first point as a first distance;

decoding the bit stream to obtain signs of the residual values of the second point based on the absolute values of the residual values of the second point and the first distance;

obtaining coordinate values of the second point based on the absolute values of the residual values of the second point and the signs of the residual values of the second point.

Optionally, in the point cloud decoding method, the decoding the bit stream to obtain signs of the residual values of the second point based on the absolute values of the residual values of the second point and the first distance, comprises:

traversing the signs of the residual values to obtain M residual values;

obtaining M points based on the M residual values and coordinate values of the first point;

calculating distances from the parent point of the first point to the M points as second distances;

determining feasibilities of the signs of the residual values corresponding to the M points based on the second distances and the first distance;

decoding the bit stream to obtain the signs of the residual values of the second point based on the feasibilities of the signs of the residual values corresponding to the M points.

In addition, to achieve the above purpose, the present disclosure also provides a point cloud decoding device, wherein the device comprises a processor, a memory and a communication bus; the memory stores one or more computer readable programs which are executable by the processor;

the communication bus realizes a connection communication between the processor and the memory;

the processor, when executing the one or more computer readable programs, implements the steps in the point cloud decoding method as described above.

The present disclosure calculates a distance from a first point to a parent point of the first point as a first distance; determines a point in un-encoded points closest to the first point as a second point, and calculates residual values on N coordinate components from the second point to the first point; encodes absolute values of the residual values on N coordinate components from the second point to the first point; encodes signs of the residual values of the second point based on the residual values of the second point and the first distance. The present disclosure utilizes the geometry position relationship between points in a point cloud to encode the absolute values of the residual values and the feasible signs of the residual values, thereby improving the encoding efficiency of the residual values. At the same time, by optimizing the encoding efficiency of the residual values, the performance of point cloud prediction tree encoding is improved.

DETAILED DESCRIPTION

In order to make the objects, technical solutions and advantages of the present disclosure clearer and more explicit, the present disclosure is described in further detail hereinafter with reference to the accompanying drawings and by way of embodiments. It should be understood that the specific embodiments described herein are only for explaining the present disclosure and are not intended to limit the present disclosure.

Figure 1:
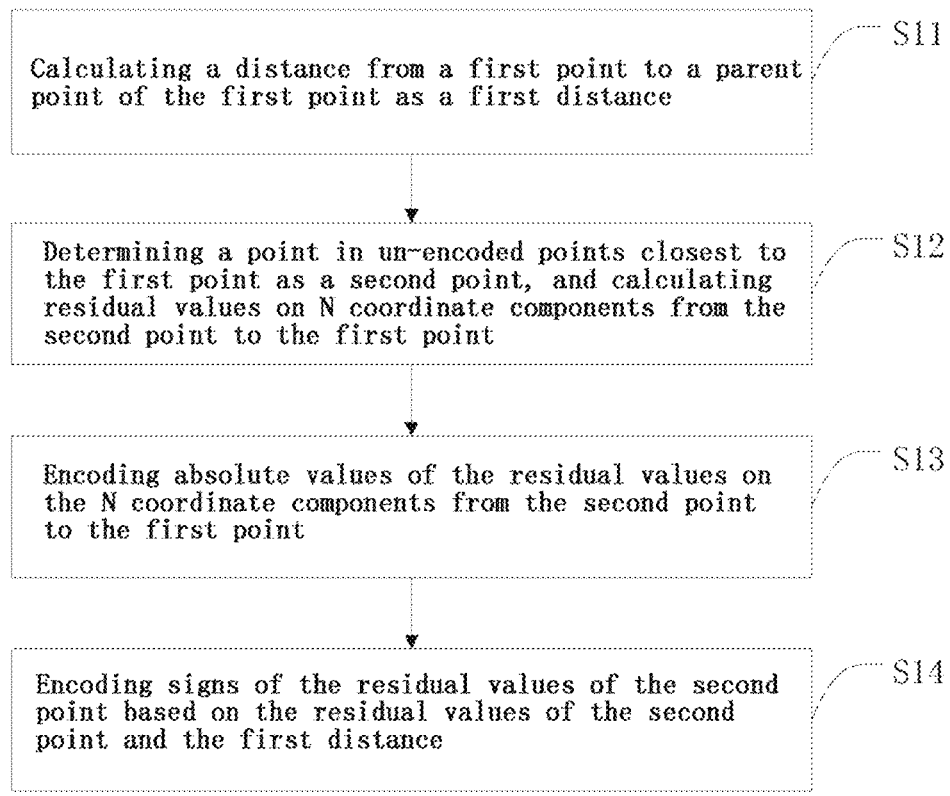
FIG. 1 is a flowchart of a point cloud encoding method provided by a non-limiting embodiment or aspect of the present disclosure.

In a non-limiting embodiment or aspect of the present disclosure, as shown in FIG. 1, the point cloud encoding method comprises the following steps:

Step S11, calculating a distance from a first point to a parent point of the first point as a first distance.

Specifically, the method comprises taking the previously encoded point as the first point, obtaining the coordinate values of the first point, and obtaining the coordinate values of the parent point of the first point. The coordinate values include N coordinate components (N represents a constant, for example, N is 3). The method of calculating the first distance based on N coordinate components may be the weighted sum of the T-powers (T represents a constant) of absolute values of the differences between N coordinate components of two points, or it may be the maximum value of weighted absolute values of the differences between N coordinate components of two points.

Furthermore, when implementing the 3D point cloud encoding, the present disclosure obtains the encoded first point $P_1$ and the 3D coordinate values $(x_1, y_1, z_1)$ of the first point in the point cloud, and obtains the parent point $P_0$ of the first point $P_1$ and the 3D coordinate values $(x_0, y_0, z_0)$ of the parent point $P_0$, and the distance between the first point $P_1$ and the parent point $P_0$ is the closest. The distance from the first point $P_1$ to the parent point $P_0$ is calculated, which is denoted as $C(P_1, P_0)$.

Step S12, determining a point in un-encoded points closest to the first point as a second point, and calculating residual values on N coordinate components from the second point to the first point.

Specifically, the definition of distance here is the same as in step S11; the N coordinate components of the second point are subtracted from the N coordinate components of the first point to obtain the residual values.

Furthermore, when implementing 3D point cloud encoding in the present disclosure (i.e. when N is equal to 3), the second point $P_2$ closest to the first point $P_1$ and the 3D coordinate values $(x_2, y_2, z_2)$ of the second point $P_2$ are obtained through a preset distance calculation method from the un-encoded points, and the residual values from the second point $P_2$ to the first point $P_1$ are calculated as $(x_r, y_r, z_r) = (x_2-x_1, y_2-y_0, z_2-z_1)$.

Step S13, encoding absolute values of the residual values on the N coordinate components from the second point to the first point.

Specifically, the absolute values of the residual values on N coordinate components are encoded separately, and the encoding method may be any existing encoding method.

Furthermore, when implementing the 3D point cloud encoding, the present disclosure calculates the absolute values $(x_a, y_a, z_a)$ of the residual values $(x_r, y_r, z_r)$, and performs arithmetic encoding on the absolute values $(x_a, y_a, z_a)$ of the residual values.

Step S14, encoding signs of the residual values of the second point based on the residual values of the second point and the first distance.

Specifically, by traversing the signs of the residual values, M (M represents a constant, for example, M is 8) residual values are obtained. Based on the M residual values and the coordinate values of the first point, M points are obtained. The distances from the parent point to the M points are calculated as the second distances (the second distances are determined either by calculating the weighted sum of the P-powers of absolute values of the differences between N coordinate components of two points, or by calculating the maximum value of the weighted absolute values of the differences between N coordinate components of the two points). The feasibilities of the signs of the residual values corresponding to M points are determined based on the second distances and the first distance. The signs of the residual values of the second point are encoded based on the feasibilities of the signs of the residual values.

Furthermore, when implementing the 3D point cloud encoding (i.e., N equals to 3), if the residual value $x_r$, $y_r$, or $z_r$ is positive, its corresponding sign is the first preset value, for example, the first preset value is 1. If the residual value $x_r$, $y_r$, or $z_r$ is negative, its corresponding sign is the second preset value, for example, the second preset value is 0. The signs of the residual values are denoted as $s[0]\,s[1]\,s[2]$. Alternatively, the first preset value may be 0, and the second preset value may be 1.

All possibilities of $s[0]s[1]s[2]$ are enumerated, to obtain all possible residual values corresponding to the absolute values $(x_a, y_a, z_a)$ of the residual values, which are denoted as $T_0=(x_a, y_a, z_a)$, $T_1=(x_a, y_a, -z_a)$, $T_2=(x_a, -y_a, z_a)$, $T_3=(x_a, -y_a, -z_a)$, $T_4=(-x_a, y_a, z_a)$, $T_5=(-x_a, y_a, -z_a)$, $T_6=(-x_a, -y_a, z_a)$, $T_7=(-x_a, -y_a, -z_a)$, and all points positions $(T_i+P_1)$ corresponding to all possible residual values are obtained, where the value of i is 0-7.

The distances from the parent point $P_0$ to all points positions $(T_i+P_1)$ are calculated as the second distances, which are denoted as $C_i$. If the distance between the parent point $P_0$ and the current point position is less than the first distance, i.e. $C_i < C(P_1, P_0)$, then in this case, the possible point position is the closest point, which contradicts the fact that the first point $P_1$ is the closest point to the parent point $P_0$, so the residual value $T_i$ and sign bits (the corresponding values of $s[0]s[1]s[2]$) corresponding to the current point position are not feasible, and the current point position is any one of all points positions; if $C_i \geq C(P_1, P_0)$, then point position $T_i$ is feasible.

Figure 2:
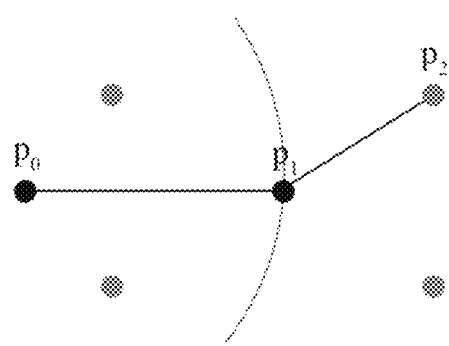
FIG. 2 is a schematic diagram of determining feasibilities of signs provided by a non-limiting embodiment or aspect of the present disclosure.

As shown in FIG. 2, which represents a schematic diagram for determining whether signs are feasible on a plane. Within the arc with a radius of $P_0$-$P_1$, there is an area with a distance less than $C(P_1, P_0)$. The points in FIG. 2 are all possible points positions, but the points positions outside the area (i.e., outside the arc with a radius of $P_0$-$P_1$) are feasible, while the points positions within the area are not feasible.

Then, the method of encoding signs of the residual values of the second point based on the feasibilities of the signs of the residual values may be as follows: mapping signs corresponding to all feasible P points to new numbers based on the feasibilities of the signs of the residual values corresponding to the M points; encoding binary bits of the new number corresponding to the signs of the residual values of the second point in a descending order; when encoding a i-th bit, set the i-th bit to 1 and the remaining un-encoded bits to 0, and record a decimal value formed thereby as D. If D>P, then it is impossible for the i-th bit to be 1, and there is no need to encode; otherwise, the i-th bit is encoded by context based arithmetic encoding.

Furthermore, when implementing the 3D point cloud encoding, the present disclosure denotes the value of the decimal number transformed from the signs $s[0]s[1]s[2]$ of the residual values as K, removes all infeasible points positions and corresponding signs, renumbers the remaining signs of the residual values according to the value of K, and denotes the sequence number of the new number $(s[0]s[1]s[2])$ as $K'=k[0]k[1]k[2]$, with the maximum number being W, where $K' \leq P \leq 7$.

The binary bits $k[0]k[1]k[2]$ of the new number $K'$ corresponding to the signs of the residual values of the second point are encoded in a descending order. When encoding the bit $k[i]$, first set the bit $k[i]$ to 1 and all subsequent un-encoded bits to 0, and a corresponding decimal value of the bits $k[0]k[1]k[2]$ is denoted as D. If D>P, then $K'>P$ when $k[i]=1$, thus there is a contradiction. Therefore, in this case, $k[i]$ must be 0. This bit does not need to be encoded. If $D \leq P$, the bit is encoded by context based arithmetic encoding.

For example, assuming $s[0]s[1]s[2]=110$, the impossible sign bits are 000, 001, and the renumber mapping is as follows:

| 000 | 001 | 010 | 011 | 100 | 101 | 110 | 111 |
|---|---|---|---|---|---|---|---|
| — | — | 0 | 1 | 2 | 3 | 4 | 5 |

Then K'=4, W=5, k[0]k[1]k[2]=100. To encode k[0]k[1]k[2], when encoding the first bit, set k[0]=1, and all subsequent bits to 0, then D=4<P, so k[0] needs to perform arithmetic encoding normally; when encoding the second bit, set k[1]=1, k[2]=0, then D=6>P, so k[1] must be 0, then there is no need to encode k[1].

The method of encoding signs of the residual values of the second point based on the feasibilities of the signs of the residual values further comprises: denoting a maximum number of infeasible signs as Wi after a bit s[i] of the signs of the residual values of the second point is encoded as 1/0; sorting bits of the signs according to the maximum number Wi of infeasible signs in a descending order; encoding the sorted bits of the signs in sequence, and checking the remaining feasible signs combinations after a bit s[i] of the signs is encoded. If the number of remaining feasible signs combinations is 1, then the remaining bit of the signs is determined, and there is no need to encode the remaining bit of the signs.

Furthermore, when implementing the 3D point cloud encoding in the present disclosure, assuming s[0]s[1]s[2]=000, the unfeasible signs are 001, 010, 011.

Set s[0]=1, then the unfeasible signs are: 000, 001, 010, 011.

Set s[0]=0, the unfeasible signs are: 001, 010, 011, 100, 101, 110, 111. W0=max(4,7)=7.

Set s[1]=1, then the unfeasible signs are: 000, 001, 010, 011, 100, 101.

Set s[1]=0, the unfeasible signs are: 001, 010, 011, 110, 111. W0=max(6,5)=6.

Set s[2]=1, then the unfeasible signs are: 000, 001, 010, 011, 100, 110.

Set s[2]=0, the unfeasible signs are: 001, 010, 011, 101, 111. W2=max(6,5)=6.

Therefore, the bits of the signs are encoded in the order of 0, 1, 2. After encoding the first bit 0, the number of the unfeasible signs is 7, with only 000 being feasible signs, thus the last 2 bits of the signs do not need to be encoded.

Figure 3:
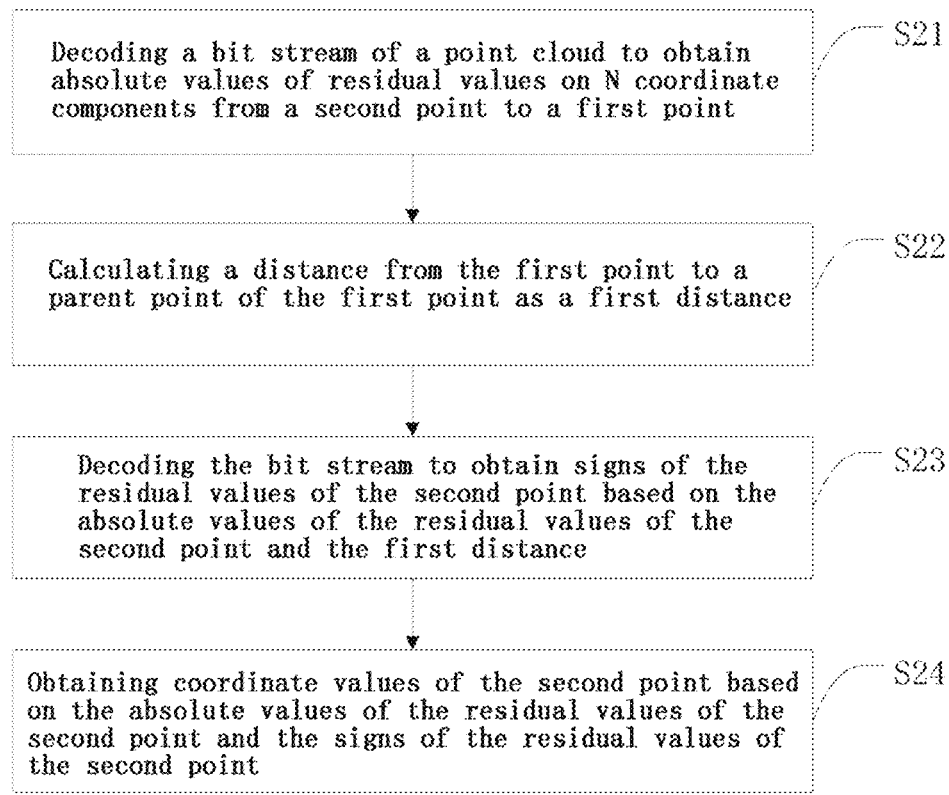
FIG. 3 is a flowchart of a point cloud decoding method provided by a non-limiting embodiment or aspect of the present disclosure.

Furthermore, as shown in FIG. 3, based on the point cloud encoding method, the present disclosure also provides a point cloud decoding method, which comprises:

Step S21, decoding a bit stream of a point cloud to obtain absolute values of residual values on N coordinate components from a second point to a first point.

Specifically, the absolute values of the residual values are decoded on N coordinate components separately, and the decoding method is corresponding to the encoding method.

Furthermore, when implementing the 3D point cloud decoding in the present disclosure (i.e., N equals to 3), the absolute values of the residual values of the second point are decoded to obtain $(x_a, y_a, z_a)$.

Step S22, calculating a distance from the first point to a parent point of the first point as a first distance.

Specifically, the last decoded point is obtained as the first point, the coordinate values of the first point are obtained, and the parent point of the first point and the coordinate values of the parent point are obtained, which includes N coordinate components. The method of calculating the first distance based on N coordinate components may be calculating a weighted sum of T-powers of absolute values of differences between N coordinate components of two points; or, calculating a maximum value of weighted absolute values of the differences between N coordinate components of two points.

Furthermore, when implementing the 3D point cloud decoding in the present disclosure (i.e., N equals to 3), the decoded first point $P_1$ and the three-dimensional coordinate values $(x_1, y_1, z_1)$ of the first point of the point cloud are obtained, and the three-dimensional coordinate values $(x_0, y_0, z_0)$ of the parent point $P_0$ of the first point $P_1$ are obtained, and the distance between the first point $P_1$ and the parent point $P_0$ is the closest. The distance from the first point $P_1$ to the parent point $P_0$ is calculated and denoted as $C(P_1, P_0)$.

Step S23, decoding the bit stream to obtain signs of the residual values of the second point based on the absolute values of the residual values of the second point and the first distance.

Specifically, the method comprises: traversing the signs of the residual values to obtain M residual values; obtaining M points based on the M residual values and coordinate values of the first point; calculating distances from the parent point of the first point to the M points as second distances; determining feasibilities of the signs of the residual values corresponding to the M points based on the second distances and the first distance; decoding the bit stream to obtain the signs of the residual values of the second point based on the feasibilities of the signs of the residual values corresponding to the M points.

Furthermore, when implementing the 3D point cloud decoding, the present disclosure denotes the signs of the residual values as s[0]s[1]s[2].

All possibilities of s[0]s[1]s[2] are enumerated, to obtain all possible residual values corresponding to the absolute values $(x_a, y_a, z_a)$ of the residual values, which are denoted as $T_0=(x_a, y_a, z_a)$, $T_1=(x_a, y_a, -z_a)$, $T_2=(x_a, -y_a, z_a)$, $T_3=(x_a, -y_a, -z_a)$, $T_4=(-x_a, y_a, z_a)$, $T_5=(-x_a, y_a, -z_a)$, $T_6=(-x_a, -y_a, z_a)$, $T_7=(-x_a, -y_a, -z_a)$, and all points positions $(T_i+P_1)$ corresponding to all possible residual values are obtained, where the value of i is 0-7.

The distances from the parent point $P_0$ to all points positions $(T_i+P_1)$ are calculated as the second distances, which are denoted as $C_i$. If the distance between the parent point $P_0$ and the current point position is less than the first distance, i.e., $C_i<C(P_1, P_0)$, then in this case, the possible point position is the closest point, which contradicts the fact that the first point $P_1$ is the closest point to the parent point $P_0$, so the residual value $T_i$ and sign bits (the corresponding values of s[0]s[1]s[2]) corresponding to the current point position are not feasible, and the current point position is any one of all points positions; if $C_i \geq C(P_1, P_0)$, then point position $T_i$ is feasible.

Then, the method of decoding signs of the residual values of the second point based on the feasibilities of the signs of the residual values may be as follows: mapping signs corresponding to all feasible P points to new numbers based on the feasibilities of the signs of the residual values corresponding to the M points; decoding binary bits of the new number corresponding to the signs of the residual values of the second point in a descending order; when decoding a i-th bit, set the i-th bit to 1 and the remaining un-decoded bits to 0, and record a decimal value formed thereby as D; if D>P, then it is impossible for the i-th bit to be 1, and there is no need to decode; otherwise, the i-th bit is decoded by context based arithmetic decoding. According to the new number, the signs of the residual values are obtained.

Furthermore, when implementing the 3D point cloud decoding, the present disclosure denotes the value of the decimal number transformed from the signs s[0]s[1]s[2] of the residual values as K, removes all infeasible points positions and corresponding signs, renumbers the remaining signs of the residual values according to the value of K, and denotes the sequence number of the new number (s[0]s[1]s[2]) as K'=k[0]k[1]k[2], with the maximum number being W, where K'≤P≤7.

The binary bits k[0]k[1]k[2] of the new number K' corresponding to the signs of the residual values of the second point are decoded in a descending order. When decoding the bit k[i], first set the bit k[i] to 1 and all subsequent un-decoded bits to 0, and a corresponding decimal value of the bits k[0]k[1]k[2] is denoted as D. If D>P, then D>P when k[i]=1, thus there is a contradiction. Therefore, in this case, k[i] must be 0. This bit does not need to be decoded. If D≤P, the bit is decoded by context based arithmetic encoding. Based on the decoded number, the signs of the residual values are obtained.

For example, assuming the impossible sign bits are 000, 001, and the to be decoded K'=k[0]k[1]k[2]=100, then it is obtained P=5 by the renumber mapping as follows:

| 000 | 001 | 010 | 011 | 100 | 101 | 110 | 111 |
|-----|-----|-----|-----|-----|-----|-----|-----|
| — | — | 0 | 1 | 2 | 3 | 4 | 5 |

To decode k[0]k[1]k[2], when decoding the first bit, set k[0]=1, and all subsequent bits to 0, then D=4<P, so k[0] needs to perform arithmetic decoding normally; when decoding the second bit, set k[1]=1, k[2]=0, then D=6>P, so k[1] must be 0, then there is no need to decode k[1]. After decoding is completed, it is known that K'=4, and it is known that s[0]s[1]s[2]=110 according to the renumber mapping table.

The method of decoding signs of the residual values of the second point based on the feasibilities of the signs of the residual values further comprises: denoting a maximum number of infeasible signs as Wi after a bit s[i] of the signs of the residual values of the second point is decoded as 1/0; sorting bits of the signs according to the maximum number Wi of infeasible signs in a descending order; decoding the sorted bits of the signs in sequence, and checking the remaining feasible signs combinations after a bit s[i] of the signs is decoded. If the number of remaining feasible signs combinations is 1, then the remaining bit of the signs is determined, and there is no need to decode the remaining bit of the signs.

Furthermore, when implementing the 3D point cloud decoding in the present disclosure, assuming s[0]s[1]s[2]=000, the unfeasible signs are 001, 010, 011.

Set s[0]=1, then the unfeasible signs are: 000, 001, 010, 011.

Set s[0]=0, the unfeasible signs are: 001, 010, 011, 100, 101, 110, 111. W0=max(4,7)=7.

Set s[1]=1, then the unfeasible signs are: 000, 001, 010, 011, 100, 101.

Set s[1]=0, the unfeasible signs are: 001, 010, 011, 110, 111. W0=max(6,5)=6.

Set s[2]=1, then the unfeasible signs are: 000, 001, 010, 011, 100, 110.

Set s[2]-0, the unfeasible signs are: 001, 010, 011, 101, 111. W2=max(6,5)=6.

Therefore, the bits of the signs are decoded in the order of 0, 1, 2. After the first bit 0 is decoded, the number of the unfeasible signs is 7, with only 000 being feasible signs, thus the last 2 bits of the signs do not need to be decoded.

Step S24, obtaining coordinate values of the second point based on the absolute values of the residual values of the second point and the signs of the residual values of the second point.

Specifically, the absolute values of the residual values are combined with the signs of the residual values to obtain the residual values of the second point, and the residual values are combined with the coordinates of the first point to obtain the coordinates of the second point.

Furthermore, when implementing the 3D point cloud decoding in the present disclosure, the absolute values of the residual values $(x_a, y_a, z_a)$ are combined with the signs of the residual values s[0]s[1]s[2] to obtain the residual values of the second point $(x_r, y_r, z_r)$, and the residual values of the second point $(x_r, y_r, z_r)$ are combined with the coordinates of the first point $(x_1, y_1, z_1)$ to obtain the coordinates of the second point $(x_2, y_2, z_2)=(x_r+x_1, y_r+y_1, z_r+z_1)$.

The present disclosure fully utilizes the distance relationship information when establishing a prediction tree by adjusting the encoding order of the absolute values and the signs of the residual values, achieving efficient encoding of geometry residual values. For example, based on the PCRM software V3.0-CE5 version, the experimental results of the method of the present disclosure and the anchor are compared. Since the method does not affect attribute encoding, only the geometry encoding results are showed, this method has significant gains under lossless condition, as shown in the table below:

|  | Total bit ratio | Geometry bit ratio |
|---|---|---|
| CAT1A data set | 98.90% | 98.20% |
| CAT1B data set | 99.50% | 99.10% |
| CAT2 data set | 99.40% | 99.30% |
| CAT3 data set | 100% | 100% |
| Overall average | 99.30% | 98.90% |

Comparison Results Between the Present Disclosure and PCRMv3.0-CE5

Figure 4:
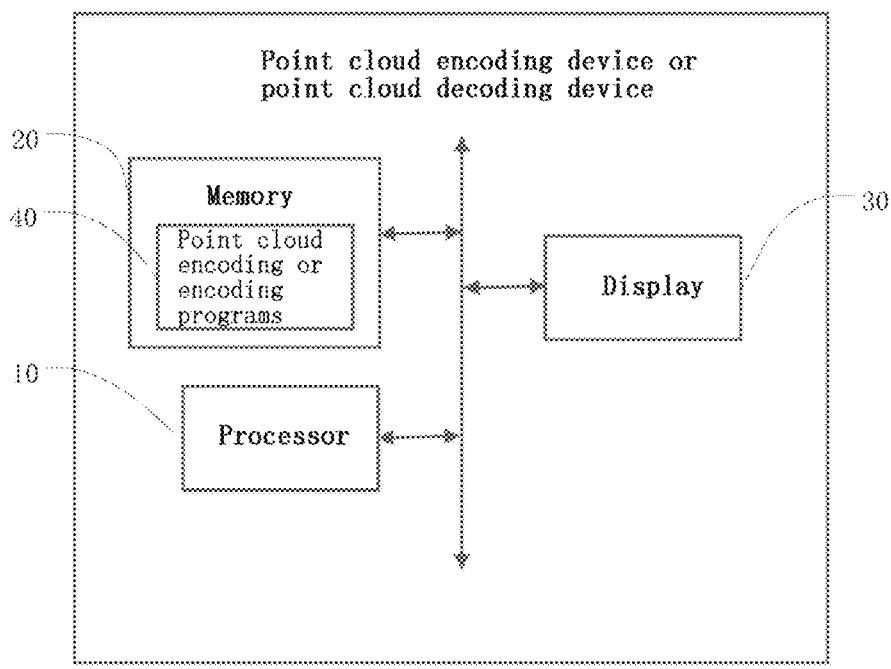
FIG. 4 is a schematic diagram of a point cloud encoding device or a point cloud decoding device provided by a non-limiting embodiment or aspect of the present disclosure.

Furthermore, as shown in FIG. 4, based on the point cloud encoding method or the point cloud decoding method, the present disclosure also provides a point cloud encoding device or a point cloud decoding device, the point cloud encoding device or the point cloud decoding device includes a processor 10, a memory 20, and a display 30. FIG. 4 only shows some of the components of the point cloud encoding device or the point cloud decoding device. It should be understood that it is not required to implement all the shown components, and more or fewer components may be implemented as substitutes.

In some embodiments, the memory 20 may be an internal storage unit of the point cloud encoding device or the point cloud decoding device, such as a hard disk or memory of the point cloud encoding device or the point cloud decoding device. In other embodiments, the memory 20 may also be an external storage device of the point cloud encoding device or point cloud decoding device, such as a plug-in hard disk, Smart Media Card (SMC), Secure Digital (SD) card, Flash Card, etc. provided in the point cloud encoding device or point cloud decoding device. Furthermore, the memory 20 may also include both internal storage unit and external storage device of the point cloud encoding device or the point cloud decoding device. The memory 20 stores application software and various data installed in the point cloud encoding device or the point cloud decoding device, such as program installed in the point cloud encoding device or the point cloud decoding device. The memory 20 may temporarily store data that has been output or will be output. In an embodiment, the memory 20 stores a point cloud encoding program or a point cloud decoding program 40, the point cloud encoding program or the point cloud decoding program 40 may be executed by the processor 10 to implement the point cloud encoding method or the point cloud decoding method in the present disclosure.

In some embodiments, the processor 10 may be a Central Processing Unit (CPU), microprocessor, or other data processing chip, used for executing program or processing data stored in the memory 20, such as executing the point cloud encoding method or the point cloud decoding method, etc.

In some embodiments, the display 30 may be an LED display, a liquid crystal display, a touch sensitive liquid crystal display, and an OLED (Organic Light Emitting Diode) touchpad. The display 30 may display information, as well as a visual user interface of the point cloud encoding device or point cloud decoding device. The components 10-30 of the point cloud encoding device or the point cloud decoding device communicate with each other through a system bus.

In an embodiment, when the processor 10 executes the point cloud encoding program or the point cloud decoding program 40 in the memory 20, the steps of the point cloud encoding method or the point cloud decoding method are implemented.

The present disclosure provides a point cloud encoding method, a point cloud decoding method, a point cloud encoding device and a point cloud decoding device. The point cloud encoding method includes: calculating a distance from a first point to a parent point of the first point as a first distance; determining a point in un-encoded points closest to the first point as a second point, and calculating residual values on N coordinate components from the second point to the first point; encoding absolute values of the residual values on the N coordinate components from the second point to the first point; encoding signs of the residual values of the second point based on the residual values of the second point and the first distance. The present disclosure utilizes the geometry position relationship between points in a point cloud to encode the absolute values of the residual values and the feasible signs of the residual values, thereby improving the encoding efficiency of the residual values. At the same time, by optimizing the encoding efficiency of the residual values, the performance of point cloud prediction tree encoding is improved.

It should be understood that, when used in the present disclosure, the terms "including/comprising" or any other variation thereof are intended to encompass non-exclusive inclusion, such that a process, method, item, or device that includes a series of elements not only includes those elements, but also includes other elements that are not explicitly listed, or also includes elements inherent to such a process, method, item, or device. Without further limitations, the element limited by the statement "including a . . . " does not exclude the existence of another identical element in the process, method, item, or device that includes that element.

It should be understood that the application of the present disclosure is not limited to the above examples, and may be improved or transformed in accordance with the above description to those of ordinary skills in the art, all of which improvements and transformations shall fall within the protection scope of the claims of the present disclosure.

What is claimed is:

1. A point cloud encoding method, comprising:
    calculating a distance from a first point to a parent point of the first point as a first distance;
    determining a point in un-encoded points closest to the first point as a second point, and calculating residual values on N coordinate components from the second point to the first point;
    encoding absolute values of the residual values on the N coordinate components from the second point to the first point; and
    encoding signs of the residual values of the second point based on the residual values of the second point and the first distance.

2. The point cloud encoding method of claim 1, wherein the encoding signs of the residual values of the second point based on the residual values of the second point and the first distance, comprises:
    traversing the signs of the residual values to obtain M residual values;
    obtaining M points based on the M residual values and coordinate values of the first point;
    calculating distances from the parent point of the first point to the M points as second distances;
    determining feasibilities of the signs of the residual values corresponding to the M points based on the second distances and the first distance; and
    encoding the signs of the residual values of the second point based on the feasibilities of the signs of the residual values corresponding to the M points.

3. The point cloud encoding method of claim 2, wherein the first distance or the second distance is determined by:
    calculating a weighted sum of T-powers of absolute values of differences between N coordinate components of two points;
    or, calculating a maximum value of weighted absolute values of differences between N coordinate components of two points.

4. The point cloud encoding method of claim 2, wherein the encoding the signs of the residual values of the second point based on the feasibilities of the signs of the residual values corresponding to the M points, comprises:
    mapping signs corresponding to all feasible P points to new numbers based on the feasibilities of the signs of the residual values corresponding to the M points; and
    encoding the new number corresponding to the signs of the residual values of the second point.

5. The point cloud encoding method of claim 4, wherein the encoding the new number corresponding to the signs of the residual values of the second point, comprises:
    encoding binary bits of the new number corresponding to the signs of the residual values of the second point in a descending order;
    when encoding a i-th bit, setting the i-th bit to 1 and the remaining un-encoded bits to 0, and denoting a corresponding decimal value as D; and
    if D>P, then the i-th bit cannot be 1, and there is no need to encode; otherwise, encoding the i-th bit by context based arithmetic encoding.

6. The point cloud encoding method of claim 2, wherein the encoding the signs of the residual values of the second point based on the feasibilities of the signs of the residual values corresponding to the M points, comprises:
    calculating a maximum number of infeasible signs after a bit of the signs of the residual values of the second point is encoded; and
    sorting bits of the signs according to the maximum number of infeasible signs in a descending order, and encoding the sorted bits of the signs in the same descending order.

7. A point cloud encoding device, comprising a processor, a memory and a communication bus; wherein the memory stores one or more computer readable programs which are executable by the processor;

the communication bus realizes a connection communication between the processor and the memory;

the processor, when executing the one or more computer readable programs, implements the steps in the point cloud encoding method according to claim 1.

8. A point cloud decoding method, comprising:

decoding a bit stream of a point cloud to obtain absolute values of residual values on N coordinate components from a second point to a first point;

calculating a distance from the first point to a parent point of the first point as a first distance;

decoding the bit stream to obtain signs of the residual values of the second point based on the absolute values of the residual values of the second point and the first distance; and obtaining coordinate values of the second point based on the absolute values of the residual values of the second point and the signs of the residual values of the second point.

9. The point cloud decoding method of claim 8, wherein the decoding the bit stream to obtain signs of the residual values of the second point based on the absolute values of the residual values of the second point and the first distance, comprises:

traversing the signs of the residual values to obtain M residual values;

obtaining M points based on the M residual values and coordinate values of the first point;

calculating distances from the parent point of the first point to the M points as second distances;

determining feasibilities of the signs of the residual values corresponding to the M points based on the second distances and the first distance; and decoding the bit stream to obtain the signs of the residual values of the second point based on the feasibilities of the signs of the residual values corresponding to the M points.

10. A point cloud decoding device, comprising a processor, a memory and a communication bus; wherein the memory stores one or more computer readable programs which are executable by the processor;

the communication bus realizes a connection communication between the processor and the memory;

the processor, when executing the one or more computer readable programs, implements the steps in the point cloud decoding method according to claim 8.

11. The point cloud decoding method of claim 9, wherein the first distance or the second distance is determined by:

calculating a weighted sum of T-powers of absolute values of differences between N coordinate components of two points;

or, calculating a maximum value of weighted absolute values of differences between N coordinate components of two points.

12. The point cloud decoding method of claim 9, wherein the decoding the bit stream to obtain the signs of the residual values of the second point based on the feasibilities of the signs of the residual values corresponding to the M points, comprises:

mapping signs corresponding to all feasible P points to new numbers based on the feasibilities of the signs of the residual values corresponding to the M points; and decoding the new number corresponding to the signs of the residual values of the second point.

13. The point cloud decoding method of claim 12, wherein the decoding the new number corresponding to the signs of the residual values of the second point, comprises:

decoding binary bits of the new number corresponding to the signs of the residual values of the second point in a descending order;

when decoding a i-th bit, setting the i-th bit to 1 and the remaining un-decoded bits to 0, and denoting a corresponding decimal value as D; and if D>P, then the i-th bit cannot be 1, and there is no need to decode; otherwise, decoding the i-th bit by context based arithmetic decoding.

14. The point cloud decoding method of claim 9, wherein the decoding the bit stream to obtain the signs of the residual values of the second point based on the feasibilities of the signs of the residual values corresponding to the M points, comprises:

calculating a maximum number of infeasible signs after a bit of the signs of the residual values of the second point is decoded; and sorting bits of the signs according to the maximum number of infeasible signs in a descending order, and decoding the sorted bits of the signs in the same descending order.

* * * * *